(12) United States Patent
Ohmi

(10) Patent No.: US 10,816,076 B2
(45) Date of Patent: Oct. 27, 2020

(54) PLASTIC HELICAL GEAR

(71) Applicant: ENPLAS CORPORATION, Saitama (JP)

(72) Inventor: Kenji Ohmi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 176 days.

(21) Appl. No.: 15/764,074

(22) PCT Filed: Jul. 26, 2016

(86) PCT No.: PCT/JP2016/071801
§ 371 (c)(1),
(2) Date: Mar. 28, 2018

(87) PCT Pub. No.: WO2017/056659
PCT Pub. Date: Apr. 6, 2017

(65) Prior Publication Data
US 2018/0274649 A1  Sep. 27, 2018

(30) Foreign Application Priority Data
Sep. 29, 2015 (JP) ................................. 2015-190700

(51) Int. Cl.
*F16H 55/08* (2006.01)
(52) U.S. Cl.
CPC ......... *F16H 55/0886* (2013.01); *F16H 55/08* (2013.01); *F16H 55/088* (2013.01); *F16H 2055/0866* (2013.01)
(58) Field of Classification Search
CPC ........ F16H 55/06; F16H 55/08; F16H 55/088; F16H 55/0886; F16H 2055/065;
(Continued)

(56) References Cited

U.S. PATENT DOCUMENTS 5,802,921 A * 9/1998 Rouverol ............ F16H 55/0806
74/458
6,253,047 B1 * 6/2001 Hildebrand ............. F16H 55/08
399/167
(Continued)

FOREIGN PATENT DOCUMENTS

CH    564999 A5 * 8/1975 ............. F16H 55/08
JP    4-22799       1/1992
(Continued)

OTHER PUBLICATIONS

International Search Report dated Oct. 25, 2016 in International (PCT) No. PCT/JP2016/071801.

*Primary Examiner* — Adam D Rogers
(74) *Attorney, Agent, or Firm* — Wenderoth, Lind & Ponack, L.L.P.

(57) ABSTRACT

A plastic helical gear has a three-dimensional tooth surface modification section on a tooth surface of each of involute-shaped teeth. The three-dimensional tooth surface modification section is a combined surface of a tooth top modification surface and an arc crowning surface. The tooth top modification surface is reduced in tooth thickness from a position between a tooth top and a tooth root toward the tooth top. The arc crowning surface is reduced in tooth thickness from a position between one end in the tooth width direction and the other end in the tooth width direction toward both ends in the tooth width direction. A line extending from an intersection point P0 between the starting position of the tooth top modification surface and the apex position of the arc crowning surface to the tooth root is aligned with a line on the tooth surface of the involute-shaped tooth.

9 Claims, 8 Drawing Sheets

(58) Field of Classification Search
CPC .. F16H 2055/0866; F16H 55/16; F16H 55/17;
G03G 15/0891; G03G 21/18
See application file for complete search history.

(56) References Cited

U.S. PATENT DOCUMENTS

| | | | | |
|---|---|---|---|---|
| 7,921,745 | B2* | 4/2011 | Takumori | F16H 55/088 |
| | | | | 74/462 |
| 8,201,471 | B2* | 6/2012 | Ohmi | F16H 55/0886 |
| | | | | 74/462 |
| 9,091,338 | B2* | 7/2015 | O-oka | F16H 55/08 |
| 9,164,474 | B2* | 10/2015 | Tampier | G03G 15/0865 |
| 10,584,784 | B2* | 3/2020 | Ohmi | F16H 55/17 |
| 2007/0125148 | A1* | 6/2007 | Dohmann | B21K 1/30 |
| | | | | 72/352 |
| 2007/0137355 | A1* | 6/2007 | Ohmi | F16H 55/0886 |
| | | | | 74/462 |
| 2008/0236320 | A1 | 10/2008 | Takumori | |
| 2017/0335942 | A1* | 11/2017 | Ohmi | F16H 55/06 |
| 2018/0291997 | A1* | 10/2018 | Vail | F16H 55/0886 |

FOREIGN PATENT DOCUMENTS

| | | | |
|---|---|---|---|
| JP | 8-197332 | | 8/1996 |
| JP | 08312755 | A * | 11/1996 |
| JP | 10-89442 | | 4/1998 |
| JP | 2008-240793 | | 10/2008 |
| JP | 2014-89483 | | 5/2014 |

* cited by examiner

PLASTIC HELICAL GEAR

TECHNICAL FIELD

The present invention relates to a plastic helical gear used for rotation transmission and, more particularly, to a plastic helical gear for which the tooth shape is modified to reduce rotation transmission error caused by misalignment of gear shafts.

BACKGROUND ART

Conventionally, in the field of power transmission devices that include helical gears, various techniques for reducing rotation transmission error caused by misalignment of gear shafts have been developed. For example, there is a known technique for reducing rotation transmission error caused by misalignment of gear shafts by performing machining (crowning) that gives an appropriate bulge in the tooth trace direction to concentrate tooth contact on the middle of the tooth width (see JP-A-8-197332 (particularly, paragraphs [0001] to [0006] and FIG. 17) and JP-A-2014-89483 (particularly, FIGS. 5 and 6)).

However, the above conventional plastic helical gear to which crowning has been applied could not sufficiently reduce rotation transmission error caused by misalignment of gear shafts.

Accordingly, the invention provides a plastic helical gear that can reduce rotation transmission error caused by misalignment of gear shafts and has good rotation transmission accuracy.

SUMMARY OF THE INVENTION

The invention relates to a plastic helical gear 1 having a three-dimensional tooth surface modification section 12 on a tooth surface 11 of each of involute-shaped teeth 2. In the invention, the three-dimensional tooth surface modification section 12 of the tooth surface 11 is a combined surface of a tooth top modification surface 16 and an arc crowning surface 18. The tooth top modification surface 16 is gradually reduced in tooth thickness from a position between a tooth top 13 and a tooth root 14 toward the tooth top 13 along an entire tooth width extending along a central axis of the gear. The arc crowning surface 18 is gradually reduced in tooth thickness from a position between the first end in a tooth width direction and the second end in the tooth width direction extending along the central axis of the gear toward both the first and second ends in the tooth width direction along an entire tooth height between the tooth root and the tooth top. The tooth surface 11 of each of the involute-shaped teeth 2 remains as a line L1 extending from an intersection point P0 between a starting position of the tooth top modification surface 16 and an apex position of the arc crowning surface 18 to the tooth root 14.

Advantageous Effects of Invention

The plastic helical gear according to the invention is capable of reducing rotation transmission error caused by misalignment of gear shafts and improving rotation transmission accuracy even when misalignment of gear shafts is present as compared with plastic helical gears to which tooth shape modification is not applied. In addition, the plastic helical gear according to the invention is capable of reducing variations (increasing robustness) in rotation transmission error with respect to alignment error as compared with plastic helical gears to which tooth shape modification is not applied.

BRIEF DESCRIPTION OF THE DRAWINGS

FIG. 1A is a front view illustrating the plastic helical gear, FIG. 1B is a cross sectional view illustrating the plastic helical gear taken along line A1-A1 in FIG. 1A, and FIG. 1C is a perspective view illustrating a tooth of the plastic helical gear 1 according to the embodiment as seen from obliquely upward.

DESCRIPTION OF THE INVENTION

An embodiment of the invention will be described in detail below with reference to the drawings.

Figure 1A:
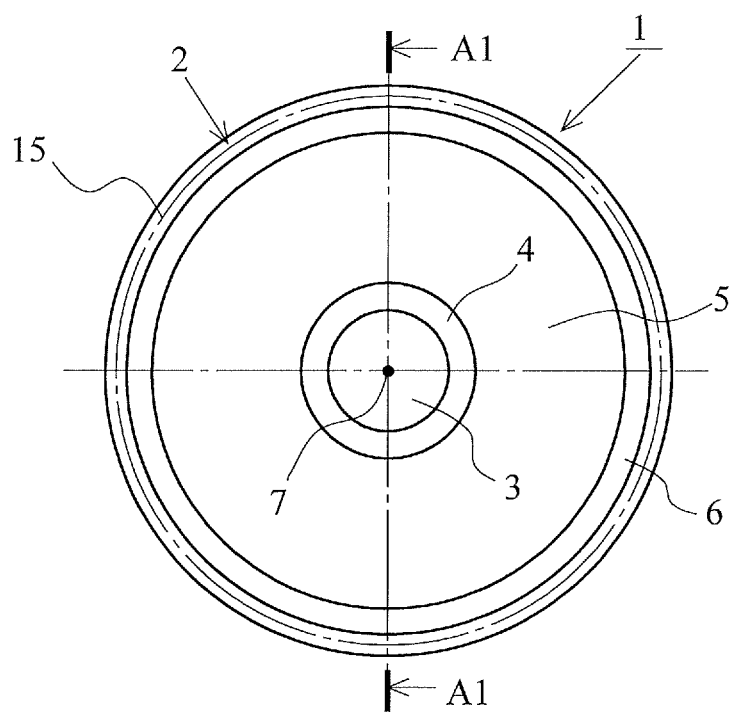
FIGS. 1A-1C illustrate a plastic helical gear according to an embodiment of the invention.
Figure 1B:
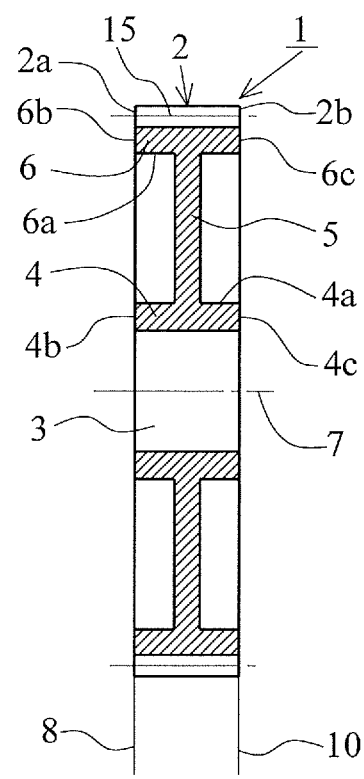
Figure 1C:
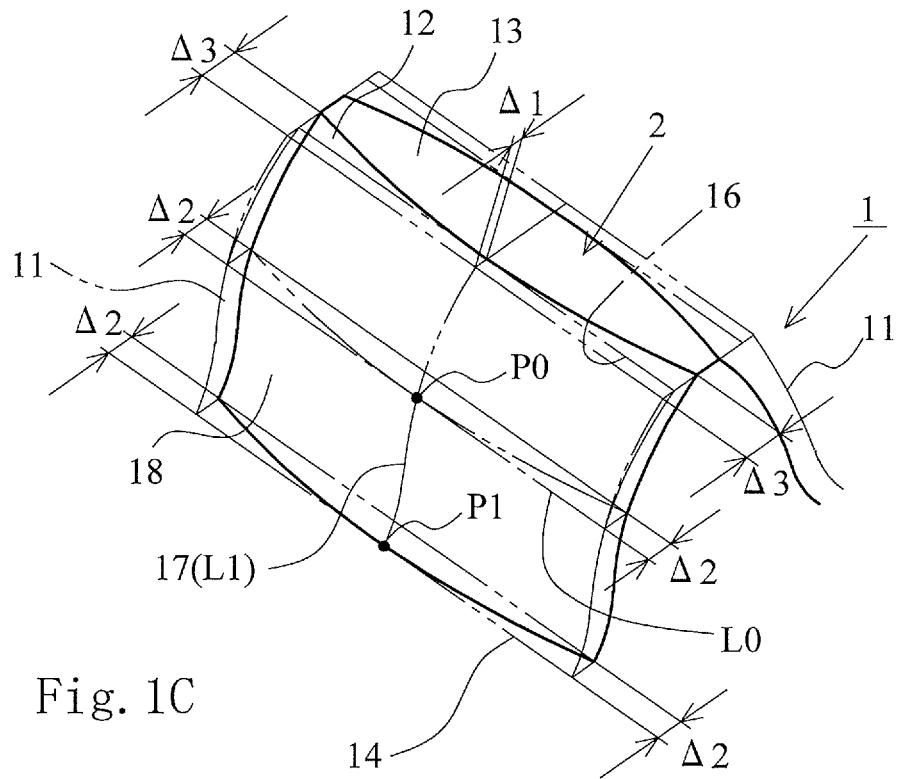
Figures 1, 2, 2A:
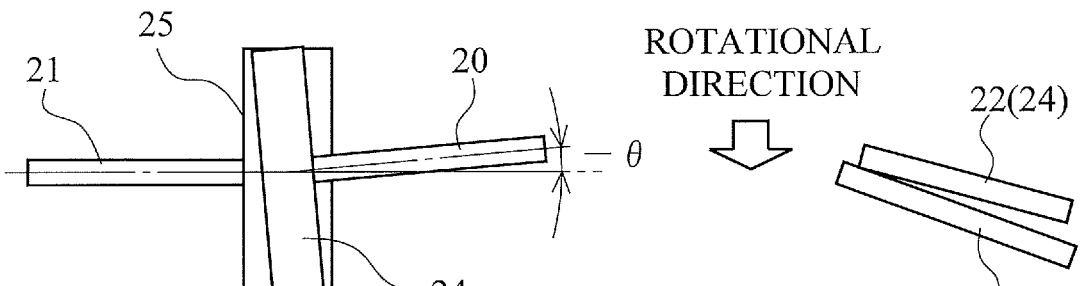
FIG. 2A-1 through 2C-2 schematically illustrate the engagement state of teeth when misalignment of gear shafts occurs and the engagement state of the teeth when misalignment of the gear shafts does not occur.

FIG. 1 illustrates the plastic helical gear 1 according to the embodiment of the invention. It should be noted that FIG. 1A is a front view illustrating the plastic helical gear 1 according to the embodiment. In addition, FIG. 1B is a cross sectional view illustrating the plastic helical gear 1 taken along line A1-A1 in FIG. 1A. In addition, FIG. 1C is a perspective view illustrating the tooth 2 of the plastic helical gear 1 according to the embodiment as seen from obliquely upward.

As illustrated in FIGS. 1A-1C, the plastic helical gear 1 includes a cylindrical boss 4 having a shaft hole 3 to be inserted onto the shaft, a discoid web 5 extending radially outward from an outer peripheral surface 4a of the boss 4, a cylindrical rim 6 formed at the outer peripheral end of the web 5, and the plurality of teeth 2 formed on the outer peripheral side of the rim 6. In addition, in the plastic helical gear 1, the web 5 that connects the outer peripheral surface 4a of the boss 4 to an inner peripheral surface 6a of the rim 6 is positioned in the middle along a center axis 7 of the boss 4. In addition, the plastic helical gear 1 is formed so that one side surface 4b (left side surface in FIG. 1B) of the boss 4, one side surface 6b (left side surface in FIG. 1B) of the rim 6, and one end surface 2a (left end surface in FIG. 1B) in the tooth width direction of the tooth 2 are positioned on a first virtual plane 8 orthogonal to the center axis 7. In addition, the plastic helical gear 1 is formed so that the other side surface 4c (right side surface in FIG. 1B) of the boss 4, the other side surface 6c (right side surface in FIG. 1B) of the rim 6, and the other end surface 2b (right end surface in FIG. 1B) in the tooth width direction of the tooth 2 are positioned on a second virtual plane 10 in parallel to the first virtual plane 8 and orthogonal to the center axis 7. The plastic helical gear 1 described above is made of plastic such as polyacetal (POM) or polyamide (PA).

The tooth 2 of the plastic helical gear 1 illustrated in FIG. 1C is formed by applying three-dimensional tooth surface modification to both tooth surfaces 11 and 11 of the tooth 2 having an involute shape (standard tooth shape). That is, in the plastic helical gear 1 according to the embodiment, the three-dimensional tooth surface modification section 12 of the tooth surface 11 is a combined surface of the tooth top modification surface 16 and the arc crowning surface 18. The tooth top modification surface 16 is gradually reduced in tooth thickness from a position (line segment extending in the tooth width direction and passing through the point P0 on a reference pitch circle 15) L0 on the tooth surface 11 between the tooth top 13 and the tooth root 14 toward the tooth top 13 along an entire tooth width extending along a central axis of the gear, as shown in FIG. 1C. The arc crowning surface 18 is gradually reduced in tooth thickness from a position (line segment 17 on the tooth surface 11 positioned in the middle in the tooth width direction and extending from the tooth top 13 to the tooth root 14) on the tooth surface 11 between the first end in the tooth width direction extending along the central axis of the gear 1 and the second end in the tooth width direction toward both the first and second ends in the tooth width direction along an entire tooth height between the tooth root and the tooth top. The tooth surface 11 of the involute-shaped tooth 2 remains as the line L1 extending from the intersection point P0 (point in the middle in the tooth width direction on the reference pitch circle) between the starting position of the tooth top modification surface 16 and the apex position of the arc crowning surface 18 to the middle (P1) in the tooth width direction of the tooth root 14. In addition, in the plastic helical gear 1, the tooth shape modification amount Δ3 at both ends in the tooth width direction is the sum (Δ1+Δ2) of the tooth shape modification amount Δ1 at the tooth top 13 of the tooth top modification surface 16 and the tooth shape modification amount Δ2 at both ends in the tooth width direction of the arc crowning surface 18. Since the same three-dimensional tooth surface modification is applied to both tooth surfaces 11 and 11, one of both tooth surfaces 11 and 11 is described in detail and the other of both tooth surfaces 11 and 11 is not described in the description of the tooth 2 of the plastic helical gear 1 based on FIG. 1C.

Figures 1, 2, 2B:
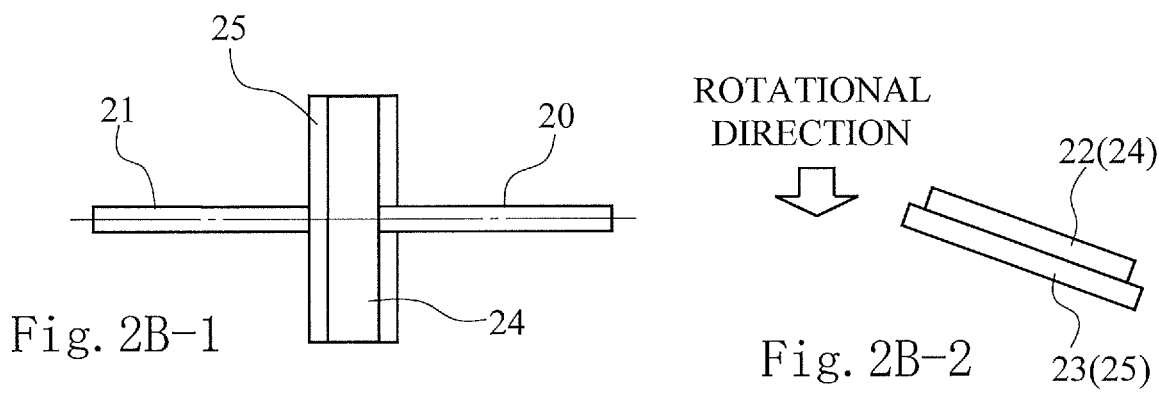
Figures 1, 2, 2C:
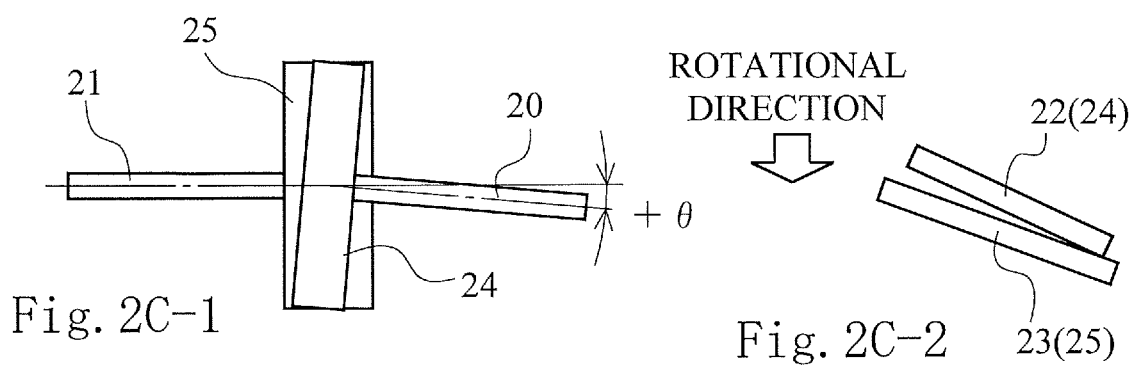

FIGS. 2A-1 through 2C-2 schematically illustrate the engagement state of teeth 22 and 23 when misalignment of gear shafts 20 and 21 occurs and the engagement state of the teeth 22 and 23 when misalignment of the gear shafts 20 and 21 does not occur. It should be noted that FIG. 2A-1 illustrates the state in which the gear shaft 20 of a driving helical gear 24 is assembled to the gear shaft 21 of a driven helical gear 25 with the gear shaft 20 deviating from the gear shaft 21 by −θ. FIG. 2A-2 illustrates the engagement state of the teeth 22 of the driving helical gear 24 and the teeth 23 of the driven helical gear 25 in FIG. 2A-1. In addition, FIG. 2B-1 illustrates the state in which the gear shaft 20 of the driving helical gear 24 is assembled to the gear shaft 21 of the driven helical gear 25 with the gear shaft 20 not deviating from (not misaligned with) the gear shaft 21. FIG. 2B-2 illustrates the engagement state of the teeth 22 of the driving helical gear 24 and the teeth 23 of the driven helical gear 25 in FIG. 2B-1. In addition, FIG. 2C-1 illustrates the state in which the gear shaft 20 of the driving helical gear 24 is assembled to the gear shaft 21 of the driven helical gear 25 with the gear shaft 20 deviating from the gear shaft 21 by +θ. FIG. 2C-2 illustrates the engagement state of the teeth 22 of the driving helical gear 24 and the teeth 23 of the driven helical gear 25 in FIG. 2C-1. In addition, in the driving helical gear 24 and the driven helical gear 25 illustrated in FIG. 2A-1, FIG. 2B-1, and FIG. 2C-1, the tooth width of the driving helical gear 24 is smaller than the tooth width of the driven helical gear 25 for convenience sake to clarify the difference between these gears.

Figure 3:
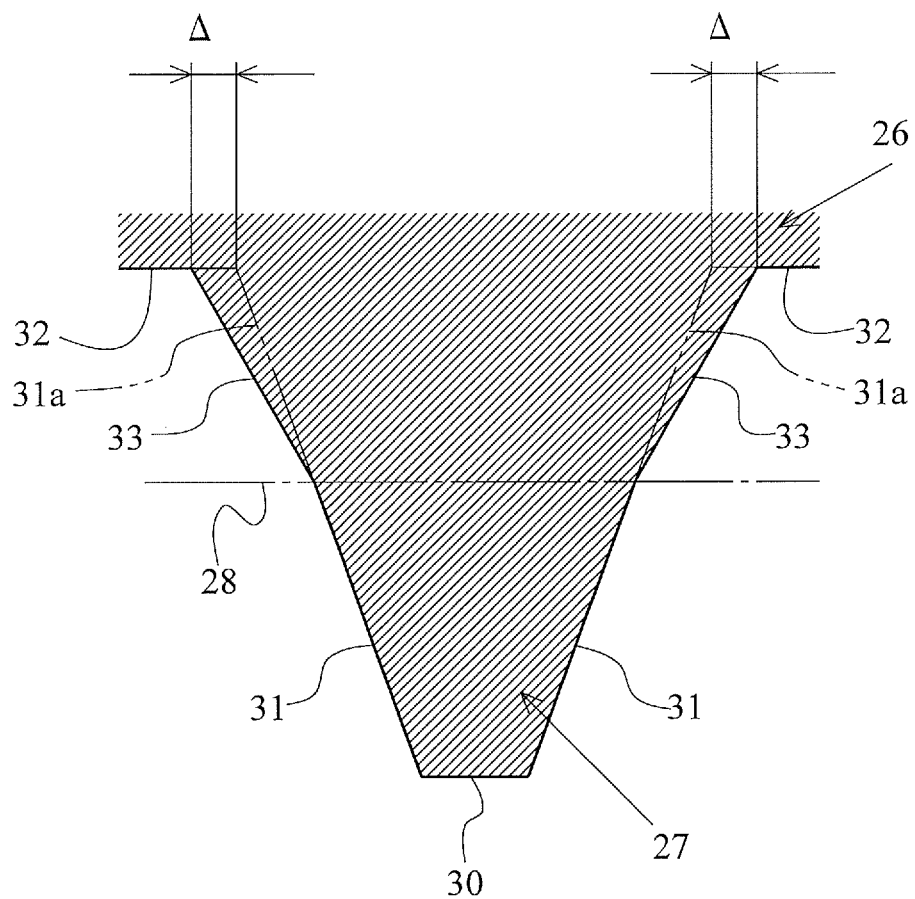
FIG. 3 illustrates the cross sectional shape of a blade of a hob, which is a rack type tool.

FIG. 3 illustrates the cross sectional shape of a blade 27 of a hob 26, which is a rack type tool. The hob 26 having the blade 27 illustrated in FIG. 3 is used to creation-machine a discharge machining master of an injection molding die for the plastic helical gear 1 illustrated in FIG. 1, the part from a position 28 corresponding to the reference pitch circle to a blade tip 30 is a standard tooth shape section (involute tooth shape section) 31, and the part from the position 28 corresponding to the reference pitch circle to a blade root 32 is a tooth top modification surface formation section 33. In the hob 26 having the blade 27 illustrated in FIG. 3, the deviation amount (A) between an extension 31a of the standard tooth shape section 31 and the tooth top modification surface formation section 33 at the blade root 32 is determined in consideration of the tooth shape modification amount Δ1, the discharge machining gap, and the like. The discharge machining master is creation-machined by the hob 26 having the blade 27 illustrated in FIG. 3 so that the entire shape including the part corresponding to the three-dimensional tooth surface modification section 12 of the plastic helical gear 1 is the same as the shape of the plastic helical gear 1.

Figure 4:
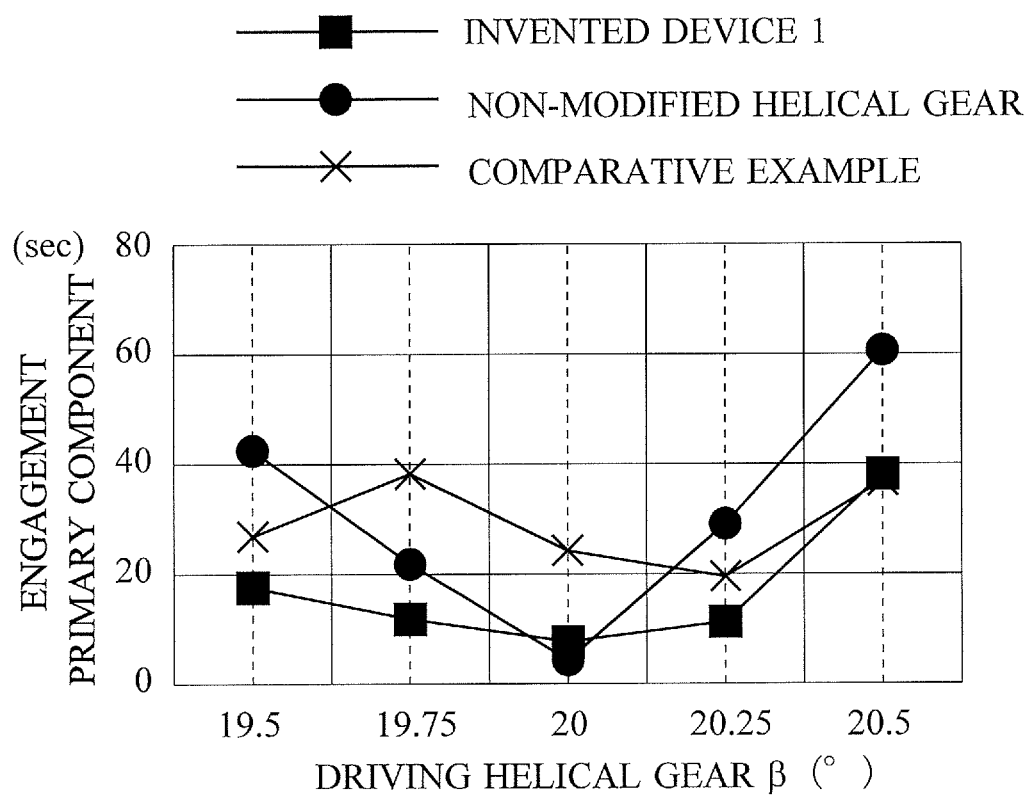
FIG. 4 illustrates the results of measurement by a one-tooth-surface engagement test of the rotation transmission error (engagement primary component) of a plastic helical gear (invented device 1) according to a first example of the invention, the results of measurement by a one-tooth-surface engagement test of the rotation transmission error (engagement primary component) of a non-modified helical gear, and the results of measurement by a one-tooth-surface engagement test of the rotation transmission error (engagement primary component) of a plastic helical gear (comparative example) to which crowning has been applied in comparison with each other under the conditions that the engagement states of the teeth illustrated in FIG. 2A-2, FIG. 2B-2, and FIG. 2C-2 are set and a load torque of 0.1 Nm is applied.

FIG. 4 illustrates the results of measurement by a one-tooth-surface engagement test of the engagement primary component as the rotation transmission error of the plastic helical gear 1 (abbreviated as the "invented device 1") according to a first example of the invention, the results of measurement by a one-tooth-surface engagement test of the engagement primary component as the rotation transmission error of a generally used plastic helical gear (non-modified helical gear) to which tooth surface modification has not been made, and the results of measurement by a one-tooth-surface engagement test of the rotation transmission error (engagement primary component) of a plastic helical gear (comparative example) to which crowning (crowning amount of 20 μm) has been applied in comparison with each other under the conditions that the engagement states of the teeth 22 and 23 illustrated in FIG. 2A-2, FIG. 2B-2, and FIG. 2C-2 are set and a load torque of 0.1 Nm is applied. In the invented device 1, the tooth shape modification amount Δ1 at the tooth top 13 in the middle in the tooth width direction of the tooth top modification surface 16 is 10 μm, the tooth shape modification amount Δ2 at both ends in the tooth width direction of the arc crowning surface 18 is 10 μm, and the tooth shape modification amount Δ3 (Δ3=Δ1+Δ2) at both ends in the tooth width direction at the tooth top 13 is 20 μm. In FIG. 4, the horizontal axis represents a torsion angle β of the driving helical gear, which will be described later, and the vertical axis represents the engagement primary component (sec) of the rotation transmission error. In the following description, the engagement primary component as rotation transmission error is abbreviated as rotation transmission error as appropriate.

The one-tooth-surface engagement tests were performed by a one-tooth-surface engagement testing machine (MEATA-4) manufactured by Ogasawara Precision Laboratory LTD. The driving helical gear 24 and the driven helical gear 25 used for the one-tooth-surface engagement tests have the following specifications. That is, the number (Z) of teeth is 36, the module (in) is 0.7, the pressure angle (α) is 20°, the torsion angle (β) is 20°, the tooth width is 7 mm, and the tooth shape is full depth tooth. In addition, the alignment errors (θ illustrated in FIG. 2A and FIG. 2C) between the gear shafts 20 and 21 are assumed to be 0.25° and 0.5° in consideration of the conditions under which the plastic helical gear 1 according to the embodiment is used. In addition, the one-tooth-surface engagement tests were performed by applying a load torque of 0.1 Nm, 0.2 Nm, or 0.25 Nm in consideration of the conditions (conditions under which a load torque from 0.1 Nm to 0.25 Nm is mainly applied) under which the plastic helical gear 1 according to the embodiment is used. As the driving helical gear 24 having the standard shape (involute tooth shape), a helical gear (non-modified helical gear) made of resin (POM (M25-equivelent)) was used. In addition, as the driven helical gear 25, one of a non-modified helical gear (not illustrated) made of resin (POM (M25-equivelent)) used as the reference for pass-fail decision of rotation transmission error, the helical gear (comparative example) made of resin (POM (M25-equivelent)) to which crowning (crowning amount of 20 μm) has been applied, the helical gear 1 made of resin (POM (M25-equivelent)) concerning the invented device 1, and the helical gear 1 made of resin (POM (M25-equivelent)) concerning the invented devices 2 and 3. Since the one-tooth-surface engagement testing machine cannot provide alignment error between the gear shafts 20 and 21 (since the gear shaft 20 of the driving helical gear 24 cannot be attached to the gear shaft 21 of the driven helical gear 25 so that the gear shaft 20 is inclined with respect to the gear shaft 21), the engagement state illustrated in FIG. 2A-2 is achieved by replacing the driving helical gear 24 (β=20°) used as the reference with the driving helical gear 24 in which the tooth 22 has torsion angles (β) of 19.5° (θ=0.5°) and 19.75° (θ=0.25°) and the engagement state illustrated in FIG. 2C-2 is achieved by replacing the driving helical gear 24 (β=20°) used as the reference with the driving helical gear 24 in which the tooth 22 has torsion angles (β) of 20.25° (θ=0.25°) and 20.5° (θ=0.5°). In addition, in the one-tooth-surface engagement testing machine, the inter-shaft distance during the test between the gear shaft 20 of the driving helical gear 24 and the gear shaft 21 of the driven helical gear 25 equals the sum of the theoretical inter-shaft distance and 0.25 mm for obtaining backlash. In the above description, POM (M25) represents Grade M25 of the product "DURACON" (registered trademark) manufactured by Polyplastics Co., Ltd.

According to the results of the one-tooth-surface engagement test illustrated in FIG. 4, the invented device 1 has substantially the same rotation transmission error as the non-modified helical gear in the state (state in which the torsion angle β of the driving helical gear 24 is 20°) in which no alignment error is present. In addition, in the state (state in which the torsion angle β of the driving helical gear 24 is 19.5°, 19.75°, 20.25°, and 20.5°) in which alignment error is present, the invented device 1 has the rotation transmission error smaller than the non-modified helical gear and has larger effects of tooth shape modification. In the invented device 1, variations in the rotation transmission error with respect to alignment error can be reduced (robustness can be improved) as compared with the non-modified helical gear. In the comparative example, although variations in the rotation transmission error with respect to alignment error can be reduced (robustness can be improved) as compared with the non-modified helical gear, the rotation transmission error was increased (became worse) in the state (state in which the torsion angle β of the driving helical gear 24 is 20°) in which no alignment error is present and in the state (state in which the torsion angle β of the driving helical gear 24 is) 19.75° in which alignment error is present. As compared with the comparative example described above, although the invented device 1 has almost the same rotation transmission error when the torsion angle β of the driving helical gear 24 is 20.5°, the rotation transmission error becomes smaller when the torsion angle β of the driving helical gear 24 ranges from 19.5° to 20.25°.

Figure 5:
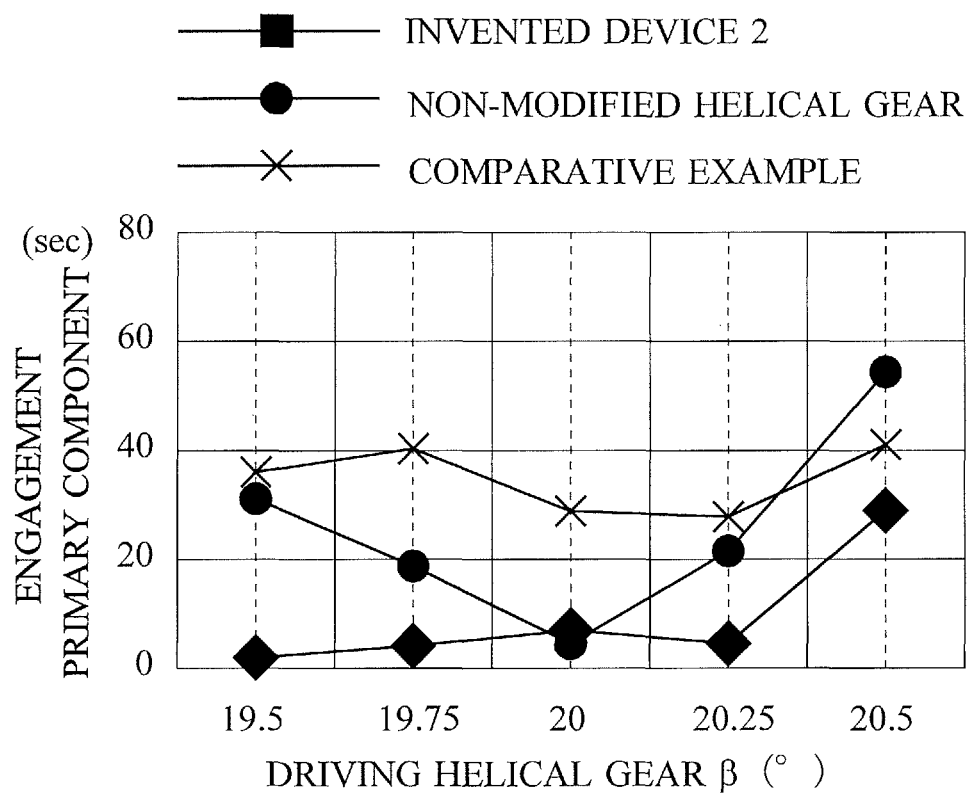
FIG. 5 illustrates the results of measurement by a one-tooth-surface engagement test of the rotation transmission error (engagement primary component) of a plastic helical gear (invented device 2) according to a second example of the invention, the results of measurement by a one-tooth-surface engagement test of the rotation transmission error (engagement primary component) of the non-modified helical gear, and the results of measurement by a one-tooth-surface engagement test of the rotation transmission error (engagement primary component) of the plastic helical gear (comparative example) to which crowning has been applied in comparison with each other under the conditions that the engagement states illustrated in FIG. 2A-2, FIG. 2B-2, and FIG. 2C-2 are set and a load torque of 0.2 Nm is applied.

FIG. 5 illustrates the results of measurement by a one-tooth-surface engagement test of the engagement primary component as the rotation transmission error of the plastic helical gear 1 (abbreviated as the "invented device 2") according to the second example of the invention, the results of measurement by a one-tooth-surface engagement test of the engagement primary component as the rotation transmission error of a generally used plastic helical gear (non-modified helical gear) to which tooth surface modification has not been made, and the results of measurement by a one-tooth-surface engagement test of the rotation transmission error (engagement primary component) of a plastic helical gear (comparative example) to which crowning (crowning amount of 20 μm) has been applied in comparison with each other under the conditions that the engagement states of the teeth 22 and 23 illustrated in FIG. 2A-2, FIG. 2B-2, and FIG. 2C-2 are set and a load torque of 0.2 Nm is applied. In the invented device 2, the tooth shape modification amount Δ1 at the tooth top 13 in the middle in the tooth width direction of the tooth top modification surface 16 is 20 μm, the tooth shape modification amount Δ2 at both ends in the tooth width direction of the arc crowning surface 18 is 10 μm, and the tooth shape modification amount Δ3 (Δ3=Δ1+Δ2) at both ends in the tooth width direction at the tooth top 13 is 30 μm. In FIG. 5, the horizontal axis represents the torsion angle β of the driving helical gear and the vertical axis represents the engagement primary component (sec) of the rotation transmission error.

According to the results of the one-tooth-surface engagement test illustrated in FIG. 5, the invented device 2 has substantially the same rotation transmission error as the non-modified helical gear in the state (state in which the torsion angle β of the driving helical gear 24 is 20°) in which no alignment error is present. In addition, in the state (state in which the torsion angle β of the driving helical gear 24 is 19.5°, 19.75°, 20.25°, and 20.5°) in which alignment error is present, the invented device 2 has the rotation transmission error smaller than the non-modified helical gear and has larger effects of tooth shape modification. In addition, in the invented device 2, variations in the rotation transmission error with respect to alignment error can be reduced (robustness can be improved) as compared with the non-modified helical gear. In the comparative example, although variations in the rotation transmission error with respect to alignment error can be reduced (robustness can be improved) as compared with the non-modified helical gear, the rotation transmission error was increased (became worse) in the state in which the torsion angle β of the driving helical gear 24 ranges from 19.5° to 20.25°. As compared with the comparative example described above, the invented device 2 can reduce the rotation transmission error regardless of whether alignment error is present.

Figure 6:
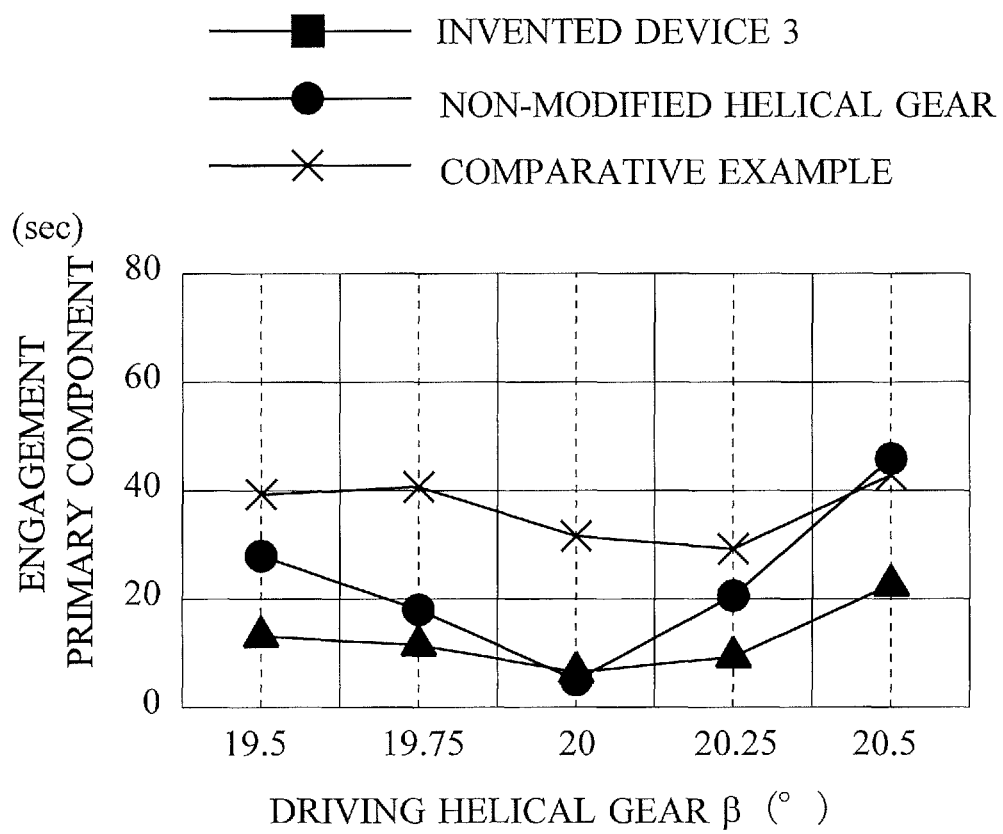
FIG. 6 illustrates the results of measurement by a one-tooth-surface engagement test of the rotation transmission error (engagement primary component) of a plastic helical gear (invented device 3) according to a third example of the invention, the results of measurement by a one-tooth-surface engagement test of the rotation transmission error (engagement primary component) of the non-modified helical gear, and the results of measurement by a one-tooth-surface engagement test of the rotation transmission error (engagement primary component) of the plastic helical gear (comparative example) to which crowning has been applied in comparison with each other under the conditions that the engagement states illustrated in FIG. 2A-2, FIG. 2B-2, and FIG. 2C-2 are set and a load torque of 0.25 Nm is applied.

FIG. 6 illustrates the results of measurement by a one-tooth-surface engagement test of the engagement primary component as the rotation transmission error of the plastic helical gear 1 (abbreviated as the "invented device 3") according to the third example of the invention, the results of measurement by a one-tooth-surface engagement test of the engagement primary component as the rotation transmission error of a generally used plastic helical gear (non-modified helical gear) to which tooth surface modification has not been made, and the results of measurement by a one-tooth-surface engagement test of the rotation transmission error (engagement primary component) of a plastic helical gear (comparative example) to which crowning (crowning amount of 20 μm) has been applied in comparison with each other under the conditions that the engagement states of the teeth 22 and 23 illustrated in FIG. 2A-2, FIG. 2B-2, and FIG. 2C-2 are set and a load torque of 0.25 Nm is applied. In the invented device 3, the tooth shape modification amount Δ1 at the tooth top 13 in the middle in the tooth width direction of the tooth top modification surface 16 is 20 μm, the tooth shape modification amount Δ2 at both ends in the tooth width direction of the arc crowning surface 18 is 20 μm, and the tooth shape modification amount Δ3 (Δ3=Δ1+Δ2) at both ends in the tooth width direction at the tooth top 13 is 40 μm. In FIG. 6, the horizontal axis represents the torsion angle β of the driving helical gear and the vertical axis represents the engagement primary component (sec) of the rotation transmission error.

According to the results of the one-tooth-surface engagement test illustrated in FIG. 6, the invented device 3 has substantially the same rotation transmission error as the non-modified helical gear in the state (state in which the torsion angle β of the driving helical gear 24 is 20°) in which no alignment error is present. In addition, in the state (state in which the torsion angle β of the driving helical gear 24 is 19.5°, 19.75°, 20.25°, and 20.5°) in which alignment error is present, the invented device 3 has the rotation transmission error smaller than in the non-modified helical gear and has larger effects of tooth shape modification. In addition, in the invented device 3, variations in the rotation transmission error with respect to alignment error can be reduced (robustness can be improved) as compared with the non-modified helical gear. In the comparative example, although variations in the rotation transmission error with respect to alignment error can be reduced (robustness can be improved) as compared with the non-modified helical gear, the rotation transmission error was increased (became worse) in the state in which the torsion angle β of the driving helical gear 24 ranges from 19.5° to 20.25°. As compared with the comparative example described above, the invented device 3 can reduce the rotation transmission error (when the torsion angle β of the driving helical gear 24 ranges from 19.5° to 20.5°) regardless of whether alignment error is present.

As is clear from the above description, the plastic helical gear 1 (invented devices 1 to 3) according to the embodiment can reduce the rotation transmission error caused by the misalignment of the gear shafts 20 and 21 as compared with the plastic helical gear to which tooth shape modification has not been made under mainly used conditions (when the load torque ranges from 0.1 Nm to 0.25 Nm) and can improve the rotation transmission accuracy even when misalignment of the gear shafts 20 and 21 occurs. In addition, the invented devices 1 to 3 can reduce variations in the rotation transmission error with respect to alignment error (can increase robustness) as compared with the plastic helical gear to which tooth shape modification has not been made under the condition used mainly (when the load torque ranges from 0.1 Nm to 0.25 Nm), thereby enabling stable rotation transmission.

As is clear from the results of the one-tooth-surface engagement tests in FIG. 4 to FIG. 6, the plastic helical gear 1 according to the embodiment is apt to obtain preferable effects (effects of reducing rotation transmission error and improving robustness) appropriate for the load torque by increasing the tooth shape modification amount Δ1 at the tooth top 13 in the middle in the tooth width direction of the tooth top modification surface 16 or increasing the tooth shape modification amount Δ2 at both ends in the tooth width direction of the arc crowning surface 18 while increasing the tooth shape modification amount Δ1 at the tooth top 13 in the middle in the tooth width direction of the tooth top modification surface 16 as the load torque increases.

(Modification 1)

Figure 7A:
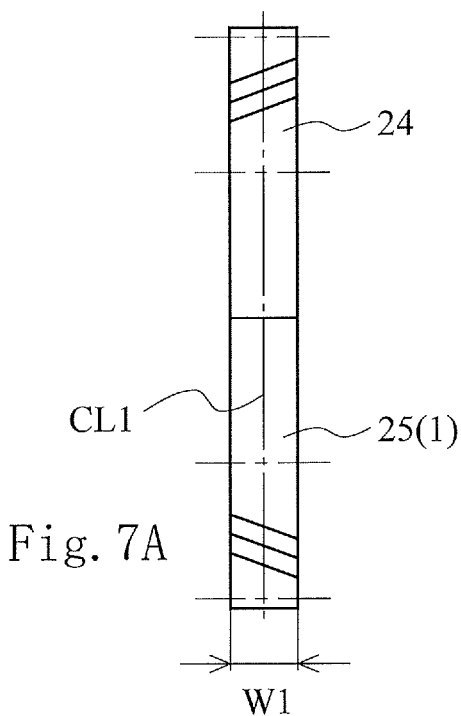
FIG. 7A illustrates the engagement state of helical gears having the same tooth width and FIG. 7B is an enlarged view illustrating the teeth engaged with each other in FIG. 7A.
Figure 7B:
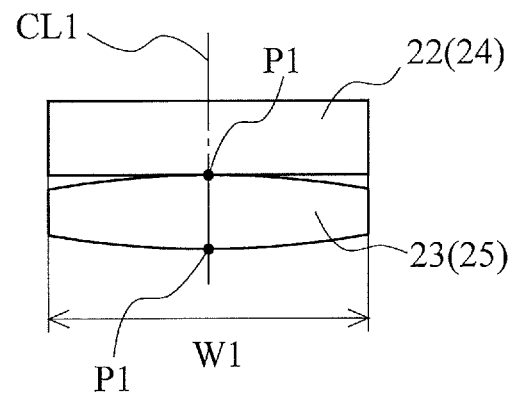

FIGS. 7A and 7B illustrate the engagement state of the driving helical gear 24 and the driven helical gear 25 according to the embodiment. FIG. 7A illustrates the engagement state of the helical gears 24 and 25 having the same tooth width W1 and FIG. 7B is an enlarged view illustrating the teeth 22 and 23 engaged with each other in FIG. 7A.

As illustrated in FIGS. 7A and 7B, the tooth 22 of the driving helical gear 24 and the tooth 23 of the driven helical gear 25 (invented devices 1 to 3) are formed to have the same tooth width W1 and the apex position P1 of crowning is present in the middle CL1 in the tooth width direction of the tooth 23.

Figure 8A:
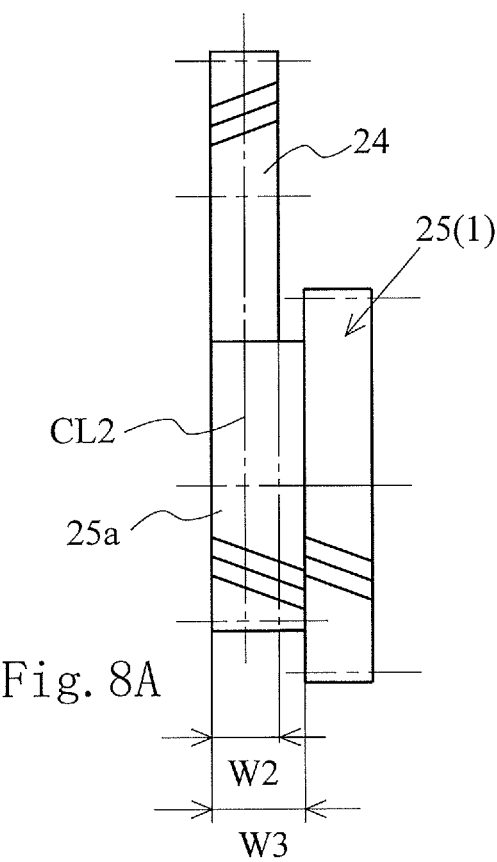
FIG. 8A illustrates the engagement state of helical gears having different tooth widths and FIG. 8B is an enlarged view illustrating the teeth engaged with each other in FIG. 8A.
Figure 8B:
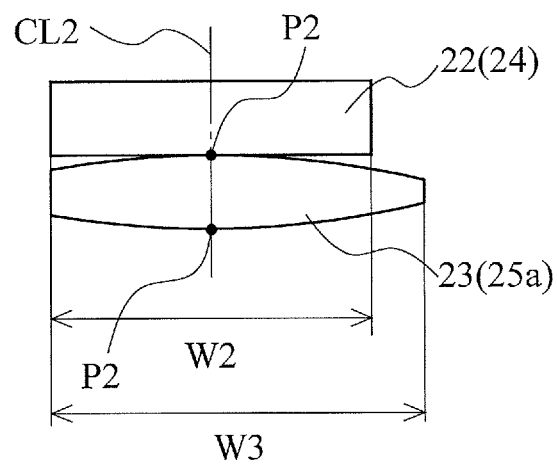

However, the plastic helical gear 1 (driven helical gear 25) according to the invention is not limited to the aspect illustrated in FIGS. 7A and 7B. When the plastic helical gear 1 is a small-diameter helical gear 25a of a combination gear and the small-diameter helical gear 25a is engaged with the driving helical gear 24 as illustrated in FIGS. 8A and 8B, since a tooth width W3 of the tooth 23 of the small-diameter helical gear 25a is different from a tooth width W2 of the tooth 22 of the driving helical gear 24 (W3>W2), an apex position P2 of crowning is present in the middle CL2 of the effective tooth width W2 engaged with the driving helical gear 24 (i.e., in the middle CL2 of an engaged tooth width extending along the central axis of the gear).

(Modification 2)

Although the starting position of the tooth top modification surface 16 is present on the reference pitch circle 15 in the plastic helical gear 1 according to the embodiment, the invention is not limited to the embodiment and the starting position of the tooth top modification surface 16 may deviate from the reference pitch circle 15 toward the tooth top 13 or the tooth root 14. In addition, although the apex position of the arc crowning surface 18 is present in the middle in the tooth width direction of the tooth 2 in the plastic helical gear 1 according to the embodiment, the invention is not limited to the embodiment and the apex position of the arc crowning surface 18 may deviate toward one end in the tooth width direction of the tooth 2 or the other end in the tooth width direction of the tooth 2.

(Application)

Figure 9:
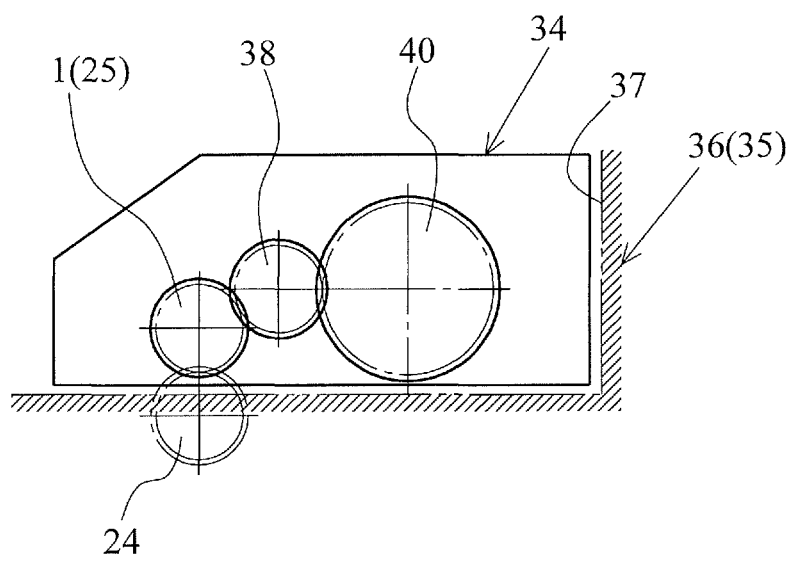
FIG. 9 is a side view illustrating a toner cartridge having the plastic helical gear according to the invention.

FIG. 9 schematically illustrates a toner cartridge 34 to which the plastic helical gear 1 according to the invention has been rotatably attached. This toner cartridge 34 illustrated in FIG. 9 is detachably attached to an image formation apparatus 35 (such as a printer, a copying machine, a facsimile, or a multifunction machine thereof). When the toner cartridge 34 is housed in a toner cartridge housing space 37 in an image formation apparatus body 36, the plastic helical gear 1 (25) according to the invention is engaged with the driving helical gear 24 attached to the image formation apparatus body 36 and the rotation of the driving helical gear 24 is transmitted to other gears 38 and 40.

It should be noted that the plastic helical gear 1 according to the invention is applicable not only to the toner cartridge 34, but also to other power transmission parts of the image formation apparatus 35, automobile components, precision machines, and the like widely.

REFERENCE SIGNS LIST

1: plastic helical gear
2: tooth
11: tooth surface
12: three-dimensional tooth surface modification section
13: tooth top
14: tooth root
16: tooth top modification surface
18: arc crowning surface
P0: intersection point
L1: line

The invention claimed is:

1. A plastic helical gear comprising:
involute-shaped teeth having a three-dimensional tooth surface modification section on a tooth surface of each of the involute-shaped teeth;
wherein the three-dimensional tooth surface modification section of the tooth surface of each of the involute-shaped teeth is formed by a combination of a tooth top modification surface and an arc crowning surface, the tooth top modification surface having a reduced tooth thickness from a position between a tooth top and a tooth root toward the tooth top along an entire tooth width extending along a central axis of the gear, the arc crowning surface having a reduced tooth thickness from a position between a first end in a tooth width direction extending along the central axis of the gear and a second end in the tooth width direction toward both the first end and the second end in the tooth width direction along an entire tooth height between the tooth root and the tooth top, and
wherein the tooth surface of each of the involute-shaped teeth remains as a line extending from an intersection point between a starting position of the tooth top modification surface and an apex position of the arc crowning surface to the tooth root.

2. The plastic helical gear according to claim 1, wherein the starting position of the tooth top modification surface is located on a reference pitch circle and the apex position of the arc crowning surface is located in a middle in the tooth width direction.

3. The plastic helical gear according to claim 2, wherein a tooth shape modification amount ($\Delta 3$) at both the first end and the second end in the tooth width direction at the tooth top is a sum of a tooth shape modification amount ($\Delta 1$) at the tooth top of the tooth top modification surface and a tooth shape modification amount ($\Delta 2$) at the first end and the second end in the tooth width direction of the arc crowning surface.

4. The plastic helical gear according to claim 1, wherein the starting position of the tooth top modification surface is located on a reference pitch circle and the apex position of the arc crowning surface is located in a middle of an engaged tooth width extending along the central axis of the gear.

5. A toner cartridge comprising a rotatable driven helical gear to be engaged with a driving helical gear attached to an image forming device body, wherein the rotatable driven helical gear is the plastic helical gear according to claim 1.

6. A plastic helical gear comprising:
involute-shaped teeth having a three-dimensional tooth surface modification section on a tooth surface of each of the involute-shaped teeth;
wherein the three-dimensional tooth surface modification section of the tooth surface of each of the involute-shaped teeth is formed by a combination of a tooth top modification surface and an arc crowning surface, the tooth top modification surface having a reduced tooth thickness from a position between a tooth top and a tooth root toward the tooth top, the arc crowning surface having a reduced tooth thickness from a position between a first end in a tooth width direction and a second end in the tooth width direction along the central axis of the gear toward both the first end and the second end in the tooth width direction,
wherein the tooth surface of each of the involute-shaped teeth remains as a line extending from an intersection point between a starting position of the tooth top modification surface and an apex position of the arc crowning surface to the tooth root,
wherein a tooth shape modification amount ($\Delta 3$) at both the first end and the second end in the tooth width direction at the tooth top is a sum of a tooth shape modification amount ($\Delta 1$) at the tooth top of the tooth top modification surface and a tooth shape modification amount ($\Delta 2$) at the first end and the second end in the tooth width direction of the arc crowning surface.

7. The plastic helical gear according to claim 6, wherein the starting position of the tooth top modification surface is located on a reference pitch circle and the apex position of the arc crowning surface is located in a middle in the tooth width direction.

8. The plastic helical gear according to claim 6, wherein the starting position of the tooth top modification surface is located on a reference pitch circle and the apex position of the arc crowning surface is located in a middle of an engaged tooth width extending along the central axis of the gear.

9. A toner cartridge comprising a rotatable driven helical gear to be engaged with a driving helical gear attached to an image forming device body, wherein the rotatable driven helical gear is the plastic helical gear according to claim 6.

* * * * *